United States Patent Office 3,011,908
Patented Dec. 5, 1961

3,011,908
ORGANOSILICON PRIMERS FOR CEMENT BASE PAINTS
Barber C. Carlson, Midland, Mich., assignor to Dow Corning Corporation, Midland, Mich., a corporation of Michigan
No Drawing. Filed Aug. 18, 1958, Ser. No. 755,439
1 Claim. (Cl. 117—70)

This invention relates to a method of priming masonry surfaces for the subsequent adherence of Portland cement base paints.

The use of a wide variety of silicones for rendering masonry surfaces water repellent is now well known. These silicones have commonly been employed as two percent or three percent by weight dispersions in either water or solvent depending on the silicone. The attempts at application of paints to such treated masonry surfaces has met with varied success. Alkyd, oleoresinous and emulsion-type paints adhere to these treated surfaces. On the other hand, cement base paints and stucco have not adhered as well as desired. The problem was partially solved as shown in U.S. Patent 2,738,291 when it was found that magnesium oxychloride cement would adhere to silicone-treated masonry. However, Portland cement stucco showed poor adhesion to the same surfaces.

The principal object of this invention is to provide a method of priming masonry surfaces to improve the adhesion of Portland cement compositions thereto.

This invention relates then to the method of comprising:

(1) Applying to a masonry surface a dispersion comprising from 0.01 to 1% by weight of an air-drying organosilicon resin,
(2) Allowing said organosilicon resin to dry,
(3) Applying to the treated surface a Portland cement composition, and
(4) Allowing the liquid Portland cement composition to dry.

The air-drying organosilicon compound can be a hydrolyzable silane, an organopolysiloxane or the alkali metal salts of either. In the organopolysiloxane at least a major portion of the polymer linkages are Si—O—Si linkages and any remaining linkages are of the type Si—Si and/or Si—R'Si where R' is a divalent hydrocarbon radical. The remaining valences of the silicon atoms in the siloxane are satisfied by monovalent hydrocarbon radicals. There are on the average from 1 to 1.5 of said radicals per silicon atom.

The above defined organosiloxanes are resins which air dry on the surface of the masonry to form a tack-free permanent coat on the walls of the masonry pores. For the purpose of this invention the siloxane resin can be applied either in the form of a completely hydrolyzed polysiloxane resin or in the form of an organosilicon compound which will form the defined resins "in situ" when applied to the masonry. Thus, one can apply to the masonry hydrolyzable silanes and mixtures thereof of the formula $R_nSiX_{4-n}$ where R is a monovalent hydrocarbon radical, $n$ has an average value of from 1 to 1.5 and X is any hydrolyzable group such as alkoxy, acetoxy, aryloxy and amino radicals and halogen and hydrogen atoms. In addition mixtures containing a major portion of the above silanes and a minor portion of silanes of the formula $(R_nSi)_aX_{2a+2-an}$ and/or silanes of the formula $(R_nSi)_aR'_{a-1}X_{2a+2-an}$ in which R, R', $n$ and X are as above defined and $a$ is an integer of at least 2, can be applied to the masonry.

In lieu of the above unhydrolyzed silanes, partial hydrolyzates of these silanes can also be employed in this invention. These partial hydrolyzates are polymeric materials which contain some residual X radicals bonded to the silicon. In general, the partial hydrolyzates are preferred to the unhydrolyzed silanes since they are less volatile and cure more rapidly after application to the masonry. Both the unhydrolyzed and the partially hydrolyzed silanes will undergo substantially complete hydrolysis, from atmospheric moisture, after application to the masonry surface to give the organopolysiloxane resins.

The organosiloxane can also be applied to the masonry in the form of metal salts. Preferably the salts of alkali metals are employed because these salts are water soluble. The salts are polymeric materials in which the metal atoms are linked to the silicon through oxygen atoms (Si—O—M). For the purposes of this invention there should be from 1 to 2, preferably from 1 to 1.2, metal atoms per silicon atom. In these salts there are on the average from 1 to 1.5 monovalent hydrocarbon radicals per silicon atom and at least a major portion of the polymer linkages are Si—O—Si linkages with any remaining polymer linkages being of the type Si—Si and/or Si—R'—Si linkages. After the salts are applied to the masonry, they react with the carbon dioxide and moisture of the atmosphere to form the siloxane resins "in situ."

For the purpose of this invention the monovalent hydrocarbon radicals (R) attached to silicon can be alkyl radicals such as methyl, ethyl, isopropyl, t-butyl and octadecyl; alkenyl radicals such as vinyl, allyl and hexadienyl; cycloaliphatic radicals such as cyclopentyl and cyclohexyl; cycloalkenyl radicals such as cyclopentenyl and cyclohexadienyl; aryl radicals such as phenyl, naphthyl and xenyl; alkaryl radicals such as tolyl and ethylphenyl and aralkyl radicals such as benzyl and xylyl. Preferably the hydrocarbon radicals are lower aliphatic hydrocarbon atoms having less than 6 carbon atoms such as methyl, ethyl, vinyl and butyl.

The divalent hydrocarbon radicals (R') linking the silicon atoms, which can appear in the organosilicon compounds of this invention can be any divalent hydrocarbon radical such as methylene, ethylene, butylene and phenylene.

Specific examples of the organosilicon compounds which can be employed in this invention are completely hydrolyzed organopolysiloxanes such as copolymers of monomethyl siloxane, monophenyl siloxane, and dimethyl siloxane; copolymers of phenyldimethyl siloxane and $SiO_2$; copolymers of phenylmethylsiloxane, monomethylsiloxane and monophenylsiloxane; copolymers of monomethylsiloxane, monobutylsiloxane and phenylmethylsiloxane and copolymers of monomethylsiloxane and methylvinyl siloxane; hydrolyzable silanes such as methyltriethoxysilane, butyltributoxysilane, methyl-tris(beta-ethoxyethyl) silane, $MeSi(OC_2H_4OC_2H_4OC_2H_5)_3$ methyltriphenoxysilane, propyltricresoxysilane, vinyltriacetoxysilane, phenyltriacetoxysilane, butyltrichlorosilane, methyldiethoxysilane; and alkali metal salts of siloxanes such as the sodium salt of monomethylsiloxane, the potassium salt of monobutylsiloxane and the sodium salt of a mixture of 75 mol percent monomethylsiloxane and 25 mol percent dimethylsiloxane in which salt there is an average of 1.1 sodium atoms per silicon atom. While the lithium, rubidium and cesium salts are operative, the sodium and potassium salts are preferable from the standpoint of solubility and ease of handling. Also operative are mixtures such as those shown in the copending application Serial No. 694,102, filed by James D. Lyons and Barber C. Carlson on November 4, 1957, and now U.S. Patent No. 2,927,909, and those shown in U.S. Patent 2,706,723.

All of the organosilicon compounds employed in this invention are commercially available including those which contain a mixture of Si—O—Si, Si—Si and Si—R'—Si linkages. These latter materials are obtained by hydrolyzing or partially hydrolyzing a residue obtained from the reaction of alkyl chlorides with silicon and of aromatic hydrocarbons with hydrogen-containing silanes. These residues are more fully described in U.S. Patents 2,681,355 and 2,774,779. The alkali metal salts of these residues can be prepared by reacting the completely hydrolyzed residues with alkali metal hydroxides.

The organosilicon compound can be added as a solvent solution of an emulsion and the alkali metal salts as aqueous solutions. Suitable solvents include xylene, toluene, mineral spirits and chlorinated hydrocarbons.

The concentration of the organosilicon compound in the dispersion employed has been found to be critical. Where the dispersion contains over 1 percent by weight of the organosilicon compound, the adhesion of the Portland cement composition to the primed surface is poorer than with no primer at all. As the concentration of the priming dispersions is reduced, the adhesive strength of the masonry-silicone-cement bond increases to a maximum in the range of concentrations from about 0.3 to 0.6 percent by weight. Below these concentrations the adhesive strength of the masonry-silicone-cement bond tapers off until the effect of the silicone completely disappears.

The Portland cement compositions which are operable in the method of this invention are generally applied as aqueous dispersions and include all compositions containing at least 48 percent by weight, preferably at least 60 percent by weight, Portland cement. Other materials which can be present include lime, water-dispersible pigments such as titanium dioxide, barium sulphate, iron oxides, calcium carbonate and iron chromate, hygroscopic salts such as sodium chloride, binders such as sodium silicate, inert fillers such as sand, mica, silica flour, calcium carbonate, asbestos and diatomaceous earth, wetting agents such as sodium tetradecylsulfate, and other common materials such as bentonite, calcium stearate, aluminum silicate and calcium chloride. The pigments can be coated with hydrolyzable silanes if desired as shown in U.S. Patent 2,760,876. Furthermore, the cement composition can contain some of the primer dispersion as shown in U.S. Patent 2,813,085.

The Portland cement composition can be in any form such as a grout, a poured concrete, a stucco or a paint, depending on terminology, composition, and fluidity. The ingredients are mixed together according to any of the conventional preparations of cement compositions incorporating water either during or after mixing the dry ingredients.

Before applying the organosilicon compound, the masonry surface should be thoroughly cleaned of all foreign matter such as dirt, loose mortar, and the like. The organosilicon compound is then applied to the masonry in any convenient manner such as by flooding, brushing, spraying or dipping.

After the organosilicon compound has been applied, the masonry is allowed to dry. The time of drying will vary with the temperature and with the degree of substitution of the organosilicon compound. In general, in hot weather 24 hours is sufficient while drying times of 72 to 96 hours may be required in the winter.

After the organosilicon resin is dry, the Portland cement composition is applied and allowed to set.

The term "masonry" refers to such materials as, for example, mortar, concrete block, set-up poured concrete, cement-base paint coatings, asbestos-cement combinations, sandstone, limestone, Portland cement stucco, shale brick, Buff brick, cinder block, brickcrete, and tile.

The following examples are merely illustrative and are not intended to limit this invention which is properly delineated in the claim.

*Example 1*

The organosilicon compound employed in this example was sodium methyl siliconate, i.e. a polysiloxane containing an average of one methyl radical per silicon atom and an average of one sodium per silicon atom.

Concrete bricks were treated by a five-second immersion in aqueous solutions containing the amounts of sodium methyl siliconate shown below. After air-drying 24 hours the concrete samples were laid up as doublets using an aqueous dispersion of a mixture of 3 parts masons' sand to 1 part Portland cement. The doublets were allowed seven days set time. Bond strength was then determined on a Baldwin Tensile Tester.

The results were as follows:

| Silicone conc. (percent by wt.): | Average bond strength (p.s.i.) |
|---|---|
| 0 | 47.3 |
| 0.33 | 142.8 |
| 0.67 | 74.5 |
| 1.0 | 61.7 |
| 2.0 | 23.0 |
| 3.0 | 11.2 |

*Example 2*

The results are similar when the organosilicon compound employed as a primer is a xylene solution of a mixture of 85% by weight of (A) an alkoxylated organosilicon fluid and 15% by weight of (B) a nonalkoxylated polysiloxane resin. The organosilicon fluid (A) has an average of about 1.1 total monovalent hydrocarbon radicals (selected from methyl, ethyl, propyl and butyl radicals) per silicon atom and 24% by weight silicon-bonded methoxy groups. A major proportion of the silicon atoms in (A) are linked through SiOSi linkages and a minor proportion of the silicon atoms in (A) are linked through SiSi, SiCH$_2$Si and SiCH$_2$CH$_2$Si linkages. The resin (B) is a copolymer of SiO$_2$ and Me$_3$SiO$_{.5}$ units in which there is an average of about 1.2 methyl groups per silicon atom.

*Example 3*

Similar results are obtained when Buff bricks, brickcrete, cinder block and tile are substituted for the concrete bricks of Example 1.

*Example 4*

With xylene solutions of the following materials in the concentrations shown in Example 1 are substituted for the aqueous solutions employed in Example 1, results similar to those of Example 1 are obtained.

A copolymer of 68.0 mol percent monomethylsiloxane units and 32.0 mol percent monophenylsiloxane units.

Monoethylpolysiloxane

A mixture of (1) 75 percent by weight of a copolymer of 75 mol percent monomethylsiloxane units, 24 mol percent dimethylsiloxane units and 1 mol percent trimethylsiloxane units and containing 8 percent by weight silicon-bonded methoxy groups and (2) 25 percent by weight of a monopropylsiloxane containing 18.4 percent by weight silicon-bonded ethoxy groups.

That which is claimed is:

The method comprising (1) applying to a masonry surface a dispersion comprising from 0.01 to 1% by weight of an air-drying organosilicon resin containing an average of from 1 to 1.5 monovalent hydrocarbon radicals per silicon atom, (2) allowing said organosilicon resin to dry, (3) applying to the treated surface a Portland cement composition and (4) allowing the Portland cement composition to set.

References Cited in the file of this patent

UNITED STATES PATENTS

| | | |
|---|---|---|
| 2,683,674 | Hatcher et al. | July 13, 1954 |
| 2,738,291 | Williams | Mar. 13, 1956 |
| 2,757,159 | Hormats | July 31, 1956 |